(12) United States Patent
Zheng

(10) Patent No.: US 8,768,162 B2
(45) Date of Patent: Jul. 1, 2014

(54) PON RING SYSTEM, AND METHOD FOR REALIZING PRIMARY AND BACKUP LINK PROTECTION IN PON

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 286 days.

(21) Appl. No.: 12/793,521

(22) Filed: Jun. 3, 2010

(65) Prior Publication Data

US 2010/0239243 A1 Sep. 23, 2010

Related U.S. Application Data

(63) Continuation of application No. PCT/CN2008/073348, filed on Dec. 5, 2008.

(30) Foreign Application Priority Data

Dec. 7, 2007 (CN) .......................... 2007 1 0195956

(51) Int. Cl.
*H04B 10/00* (2013.01)

(52) U.S. Cl.
USPC ............. 398/4; 398/3; 398/5; 398/66; 398/67

(58) Field of Classification Search
USPC .............................................. 398/1–5, 66, 67
See application file for complete search history.

(56) References Cited

U.S. PATENT DOCUMENTS

| | | | |
|---|---|---|---|
| 6,735,391 B2 | 5/2004 | Lee et al. | |
| 6,853,811 B2 | 2/2005 | Wahler et al. | |
| 7,212,540 B2 * | 5/2007 | Unitt et al. | 370/452 |
| 8,090,256 B2 * | 1/2012 | Reisslein et al. | 398/3 |
| 8,102,851 B1 * | 1/2012 | Mandin et al. | 370/390 |
| 8,213,340 B1 * | 7/2012 | Glicklich et al. | 370/258 |
| 8,285,142 B2 * | 10/2012 | Zheng | 398/67 |
| 8,406,636 B2 * | 3/2013 | Zou | 398/167 |
| 8,422,887 B2 * | 4/2013 | Haramaty et al. | 398/151 |
| 8,428,456 B2 * | 4/2013 | Zheng | 398/2 |

(Continued)

FOREIGN PATENT DOCUMENTS

| | | |
|---|---|---|
| CN | 1141546 A | 1/1997 |
| CN | 1274210 A | 11/2000 |

(Continued)

OTHER PUBLICATIONS

Translation of Office Action dated Oct. 20, 2011 in connection with Chinese Patent Application No. 200710195956.1.

(Continued)

*Primary Examiner* — Daniel Washburn
*Assistant Examiner* — Hibret Woldekidan

(57) ABSTRACT

A PON ring system and a method for realizing primary and backup link protection in a passive optical network (PON) are provided. A PON ring is established between at least two optical line terminations (OLTs) through at least two user side edge nodes or network side edge nodes. Each of the OLTs is coupled to any other OLT through the at least two edge nodes. Two links respectively in a clockwise direction and a counterclockwise direction exist in the PON ring, in which one link is a primary link and the other is a backup link. Node of the links adopt the transmission mode of "multiple sending and selective receiving". Therefore, the present invention reduces the impact on the PON caused by single link failure in the network.

7 Claims, 7 Drawing Sheets

(56) References Cited

U.S. PATENT DOCUMENTS

| | | | |
|---|---|---|---|
| 2001/0038472 A1 | 11/2001 | Lee et al. | |
| 2002/0071154 A1* | 6/2002 | Gerstel et al. | 359/124 |
| 2002/0144190 A1* | 10/2002 | Bruckman | 714/43 |
| 2002/0191617 A1* | 12/2002 | Duplessis et al. | 370/400 |
| 2003/0067644 A1 | 4/2003 | Wahler et al. | |
| 2005/0031348 A1 | 2/2005 | Choi et al. | |
| 2005/0191054 A1* | 9/2005 | Aoki et al. | 398/45 |
| 2006/0083513 A1 | 4/2006 | Huang et al. | |
| 2007/0031146 A1* | 2/2007 | Takachio et al. | 398/4 |
| 2008/0037988 A1* | 2/2008 | Bullock | 398/59 |
| 2009/0074403 A1* | 3/2009 | Chi et al. | 398/3 |
| 2009/0083822 A1* | 3/2009 | Han et al. | 725/145 |
| 2009/0169200 A1* | 7/2009 | Li et al. | 398/7 |
| 2009/0263122 A1* | 10/2009 | Helkey et al. | 398/7 |
| 2010/0021161 A1* | 1/2010 | Endo et al. | 398/45 |
| 2010/0310252 A1* | 12/2010 | Healey | 398/6 |
| 2011/0274428 A1* | 11/2011 | Chiou | 398/60 |
| 2012/0177365 A1* | 7/2012 | Winzer | 398/26 |
| 2013/0022356 A1* | 1/2013 | Ghazisaidi | 398/66 |

FOREIGN PATENT DOCUMENTS

| | | |
|---|---|---|
| CN | 1567749 A | 1/2005 |
| CN | 1889405 A | 1/2007 |
| EP | 1 087 556 A1 | 3/2001 |
| WO | WO 97/09803 A1 | 3/1997 |
| WO | WO 2005/117300 A1 | 12/2005 |
| WO | WO 2007/009938 A1 | 1/2007 |

OTHER PUBLICATIONS

Written Opinion of the International Searching Authority dated Mar. 19, 2009 in connection with International Patent Application No. PCT/CN2008/073348.

Supplementary European Search Report dated Mar. 25, 2011 in connection with European Patent Application No. 08 86 1062.

Dirceu Cavendish, "Evolution of Optical Transport Technologies: From SONET/SDH to WDM", IEEE Communications Magazine, Jun. 2000, p. 164-172.

International Search Report issued Mar. 19, 2009 in connection with International Patent Application No. PCT/CN2008/073348.

C.H. Yeh, et al., "A Protection Method for Ring-Type-PONs against Fiber Fault", OFC 2007 Joint Poster Session ii, Mar. 25, 2007, Abstract only.

Communication pursuant to Article 94(3) EPC, issued on Jan. 2, 2013 in connection with European Application No. EP 08 861 062, 4 pages.

\* cited by examiner

PON RING SYSTEM, AND METHOD FOR REALIZING PRIMARY AND BACKUP LINK PROTECTION IN PON

CROSS-REFERENCE TO RELATED APPLICATIONS

This application is a continuation of International Application No. PCT/CN2008/073348, filed on Dec. 5, 2008, which claims priority to Chinese Patent Application No. 200710195956.1, filed on Dec. 7, 2007, both of which are hereby incorporated by reference in their entireties.

TECHNICAL FIELD

The present invention relates to the field of a passive optical network (PON), and more particularly to a PON ring system and a method for realizing primary and backup link protection in a PON.

BACKGROUND

Currently, an optical fiber access network mainly adopts a PON technology. FIG. 1 is a schematic view of the structure of an optical access network (OAN) system. The OAN system includes a customer premises network (CPN), an access network (AN) and a service node function. In the AN, an adaptation function (AF) is an optional equipment, which mainly provides mutual conversion between an optical network unit (ONU)/optical network terminal (ONT) interface and a user network interface (UNI). The AF may also be built in the ONU, and in this case, the reference point "a" in FIG. 1 can be omitted. The AF may also be arranged behind an optical line termination (OLT) to provide mutual conversion between an OLT interface and a service node interface (SNI). The AF can not only be regarded as a function of the CPN, but also regarded as a function of the AN. The main network elements of the CPN and the AN include the OLT, an optical distribution network (ODN), the ONU/ONT, and the AF. T is a reference point for the UNI interface, and V is a reference point for the SNI interface. The OLT provides a network interface for the ODN, and is coupled to one or more ODNs. The ODN provides a transmission means for the OLT and the ONU/ONT. The ONU/ONT provides a user side interface for the OAN, and is coupled to the ODN. A broadband network gateway (BNG) is located at a metropolitan area network (MAN) side, and is coupled to the OLT.

A conventional PON topology is of a star structure. That is, one OLT is coupled to multiple ONU/ONTs through the ODN, and interconnection is not supported between the OLTs. This star structure causes the OLT to be the bottleneck of the PON, and a single point failure occurs easily. Once an OLT fails, breakdown of links associated thereto occurs and the network is greatly affected.

SUMMARY

The present invention is directed to a PON ring system, and a method for realizing primary and backup link protection in a PON, where the method and system are adopted to reduce the impact on the network caused by single link failure, and further solve the problem that when an OLT in the PON ring fails, data cannot be sent or received by the failed OLT, and the data already sent cannot be returned to the failed OLT any more.

In order to solve the above technical problems, in an embodiment, the present invention provides a method for realizing primary and backup link protection in a PON, which includes the following steps.

A PON ring is established between at least two OLTs through at least two user side edge nodes or network side edge nodes, and each of the OLTs is coupled to any other OLT in the PON ring through the at least two edge nodes; two links respectively in a clockwise direction and a counterclockwise direction exist in the PON ring, where one link is a primary link and the other is a backup link.

When the primary link is normal, data is received via the primary link by any node in the PON ring.

When the primary link fails, the failure is notified to nodes in the PON ring, so that any node in the PON ring receives data via the backup link.

In an embodiment, the present invention further provides a PON ring system, which includes at least two user side edge nodes or network side edge nodes, and at least two OLTs. A PON ring is established between the at least two OLTs through the at least two user side edge nodes or network side edge nodes, and each of the OLTs is coupled to any other OLT in the PON ring through the at least two edge nodes.

The PON ring is adapted to configure two links respectively in a clockwise direction and a counterclockwise direction, where one link is a primary link and the other is a backup link. When the primary link is normal, any node in the PON ring of the system receives data via the primary link. When the primary link fails, any node in the PON ring of the system receives data via the backup link.

It can be seen from the above description that, in the method for realizing primary and backup link protection in the PON and the PON ring system provided by the embodiments of the present invention, a PON ring is established first, and both a primary link and a backup link that connect two nodes are configured on the basis of the PON ring, so that when one link fails, the backup link can be adopted for data transmission, and thus the impact on the PON caused by single link failure in the network is reduced. Further, in an example of the present invention, since each of the OLTs is coupled to any other OLT through at least two edge nodes, when the primary link of one OLT fails, data stream can be returned to the OLT in a reverse direction through the backup link between the at least two edge nodes, and thus the data of the OLT is not lost. In this way, data backup can be more precise because data stream is returned to the original OLT through the backup link. Additionally, according to the embodiments of the present invention, the OLT nodes in the PON ring are coupled hierarchically through the edge nodes, so that the network cost is lowered for the establishment of the PON ring, and accurate backup of user data is also guaranteed.

DETAILED DESCRIPTION

In order to make the objectives, technical solutions and advantages of the present invention comprehensible, the present invention is further illustrated in detail below with the accompanying drawings.

The present invention provides a PON ring system. The PON topology is an inverse-connection of two Point-to-Multipoint (P-MP) trees, in the form of leaf to leaf, and used for multipath transmission; and includes at least two user side edge node equipments and at least two OLTs. The user side edge node equipments, or two or more interconnected user side edge node equipments, are coupled to the at least two OLTs to form the PON ring.

The above user side edge node equipments may be ONTs, or PON extenders.

The PON ring system of the present invention is introduced in detail hereinafter.

Embodiment 1

Figure 1:
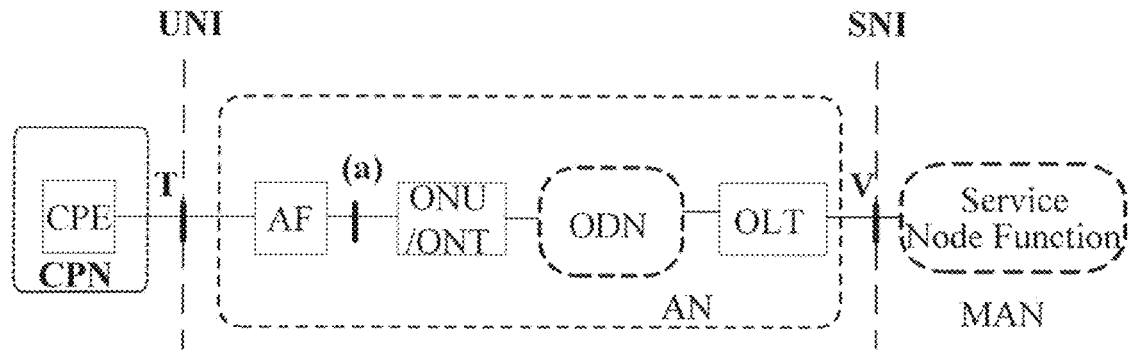
FIG. 1 is a schematic view of the structure of an OAN system.
Figure 2A:
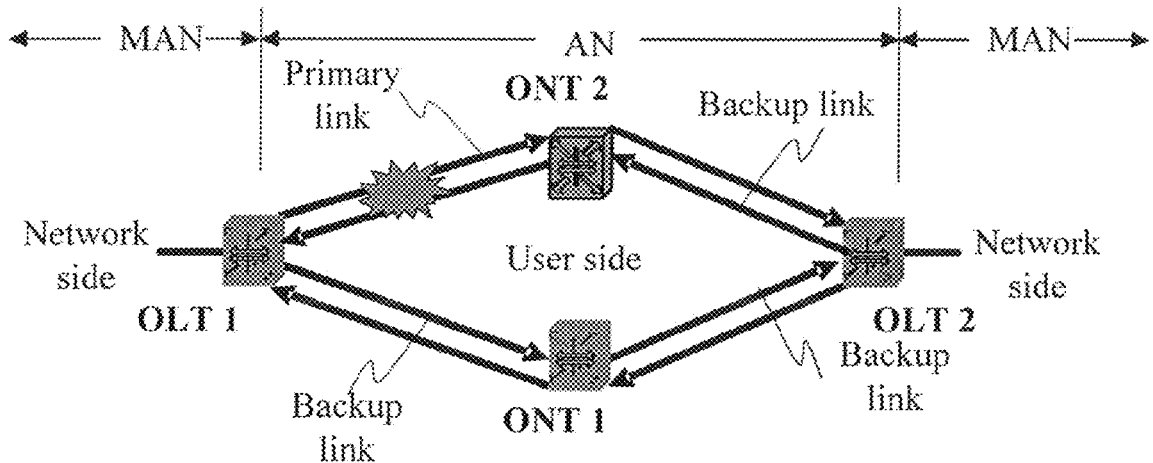
FIG. 2a is a schematic view a of the structure of a PON ring system according to embodiment 1 of the present invention.

FIG. 2a is a schematic view of the structure of a PON ring system according to embodiment 1 of the present invention. In this embodiment, ONTs are taken as an example of the user side edge nodes. In other embodiments of the present invention, the user side edge nodes may also be ONUs or PON extenders. In this embodiment, the PON ring system includes OLT1, OLT2, ONT1 and ONT2. A single bi-directional optical fiber can be used for both OLT->ONT and ONT->OLT directions, or a unidirectional optical fiber is used for the OLT->ONT direction and another unidirectional optical fiber is used for the ONT->OLT direction. The ONT1 and ONT2 are both coupled to OLT1 and OLT2 to form the PON ring. Thereby, the data stream may flow in two directions, that is, in a clockwise direction along OLT1->ONT2->OLT2->ONT1->OLT1, or in a counterclockwise direction along OLT1->ONT1->OLT2->ONT2->OLT1.

Each section of the PON connection between a PON source node (for example, OLT1) and a PON target node (for example, ONT2) constitutes an integral PON-based switching connection, Ethernet switching path (ESP) based on Provider Backbone Transport (PBT), or label switching path (LSP) based on Multi-Protocol Label Switching (MPLS). In the embodiment of the present invention, the PON-based switching connection, the ESP based on PBT, or the LSP based on MPLS are collectively called "link". For the ESP, the PON ring can be protected by a link protection method (such as EtherRing) of an Ethernet ring.

The PON ring may be configured with two links respectively in a clockwise direction and a counterclockwise direction, where one link is a primary link and the other is a backup link. When the primary link is normal, any node in the PON ring may receive data via the primary link, and when the primary link fails, any node in the PON ring may receive data via the backup link.

Taking FIG. 2a as an example, in this embodiment, two PON-based switching connections exist along the direction from OLT1 to ONT2. One is an OLT1->ONT2 link, and the other is an OLT1->ONT1->OLT2->ONT2 link, which constitute the primary and backup links or load sharing links.

Figure 2B:
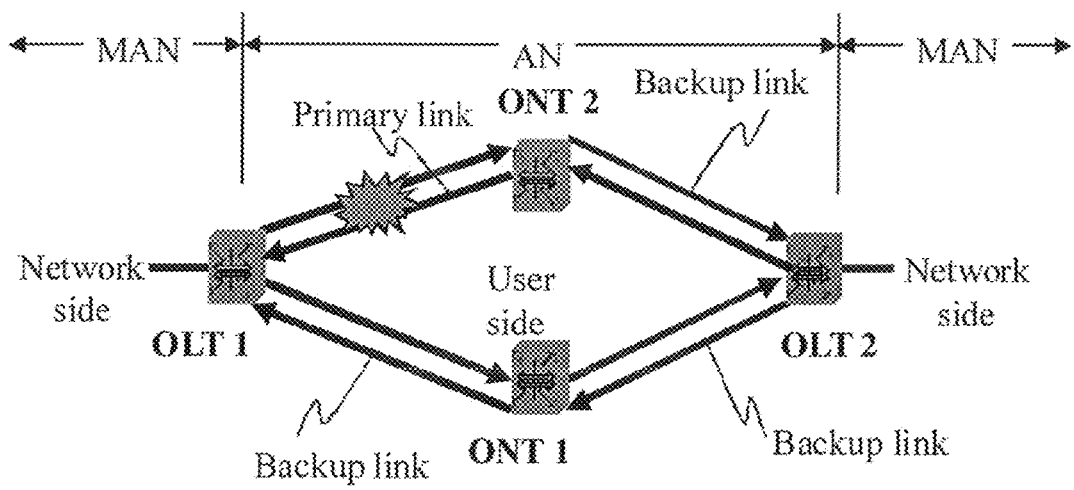
FIG. 2b is a schematic view b of the structure of the PON ring system according to embodiment 1 of the present invention.

FIG. 2b is a schematic view b of the structure of a PON ring system according to embodiment 1 of the present invention. It can be seen from FIG. 2b that, two PON-based switching connections exist along the direction from ONT2 to OLT1. One is an ONT2->OLT1 link, and the other is an ONT2->OLT2->ONT1->OLT1 link, which constitute the primary and backup links or load sharing links.

Further, two links exist between OLT1 and OLT2, that is, along the direction from OLT1 to OLT2, one is an OLT1->ONT2->OLT2 link, and the other is an OLT1->ONT1->OLT2 link, which constitute the primary and backup links or load sharing links; and along the direction from OLT2 to OLT1, one is an OLT2->ONT2->OLT1 link, and the other is an OLT2->ONT1->OLT1 link, which constitute the primary and backup links, or the load sharing links.

Further, two links also exist between ONT1 and ONT2, that is, along the direction from ONT1 to ONT2, one is an ONT1->OLT2->ONT2 link, and the other is an ONT1->OLT1->ONT2 link, which constitute the primary and backup links or load sharing links; and along the direction from ONT2 to ONT1, one is an ONT2->OLT2->ONT1 link, and the other is an ONT2->OLT1->ONT1 link, which constitute the primary and backup links or load sharing links.

In this embodiment, OLT1 and OLT2 are associated with each other through ONT1 and ONT2, instead of being directly coupled. When the primary link between OLT1 and the edge nodes fails, the data stream passes through OLT2 and flows back to OLT1 in a reverse direction via the backup link. In this case, even if the two OLTs are coupled to different servers, the requirements for data backup can also be met.

Embodiment 2

Figure 3:
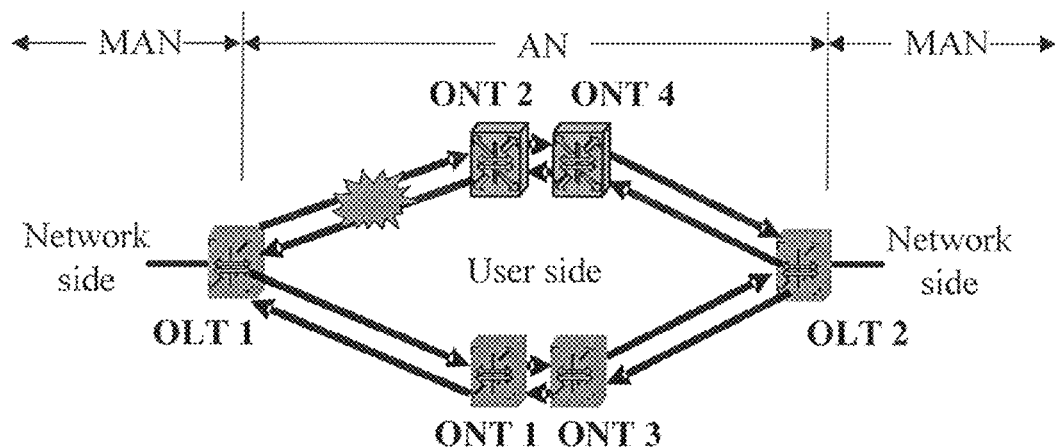
FIG. 3 is a schematic view of the structure of a PON ring system according to embodiment 2 of the present invention.

FIG. 3 is a schematic view of the structure of a PON ring system according to embodiment 2 of the present invention. In this embodiment, the PON ring system includes OLT1, OLT2, ONT1, ONT2, ONT3 and ONT4. A link composed of ONT1 and ONT3, and a link composed of ONT2 and ONT4 are both coupled to OLT1 and OLT2, so as to form the PON ring. Similar to embodiment 1, by establishing the PON ring, primary and backup links or load sharing links can be established between any two nodes.

Embodiment 3

Figure 4:
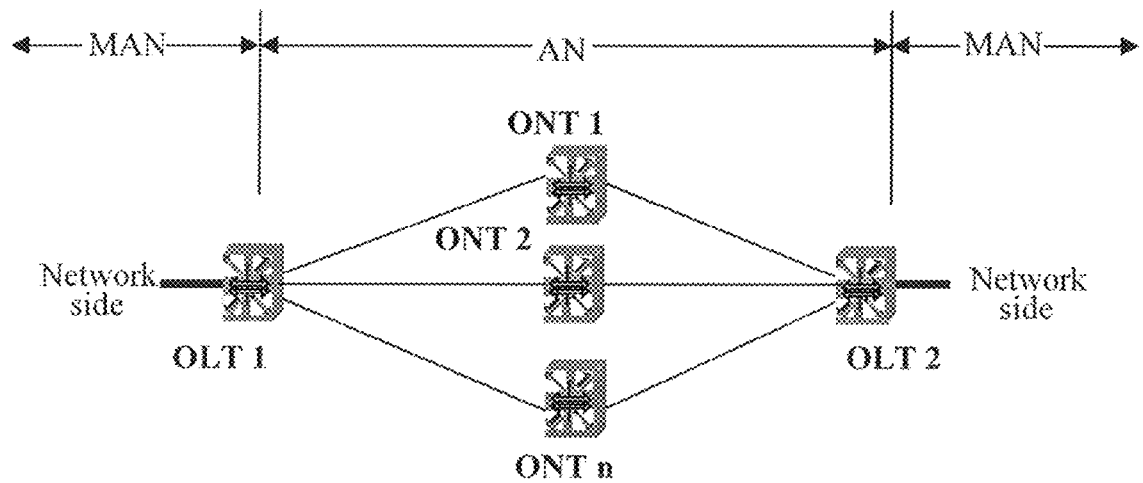
FIG. 4 is a schematic view of the structure of a PON ring system according to embodiment 3 of the present invention.

FIG. 4 is a schematic view of the structure of a PON ring system according to embodiment 3 of the present invention. In this embodiment, the PON ring system includes OLT1, OLT2, ONT1, ONT2, . . . , and ONTn. ONT1, ONT2, . . . , and ONTn are all coupled to OLT1 and OLT2, so as to form multiple PON rings. Similar to embodiment 1, by establishing the PON ring, primary and backup links or load sharing links can be established between any two nodes. It can be seen from the above that, each of the OLTs is coupled to any other OLT through at least two edge nodes, that is, no direct connection exists between the multiple OLTs and every two ONTs and two OLTs in the figure can form one PON ring. The PON topology is an inverse-connection of two P-MP trees, in the form of leaf to leaf, and used for multipath transmission.

It can be easily understood that, the above embodiment 2 may also be extended in the same manner. The multiple links established by the multiple ONTs may be simultaneously coupled to OLT1 and OLT2, so as to form multiple PON rings.

Embodiment 4

Figure 5:
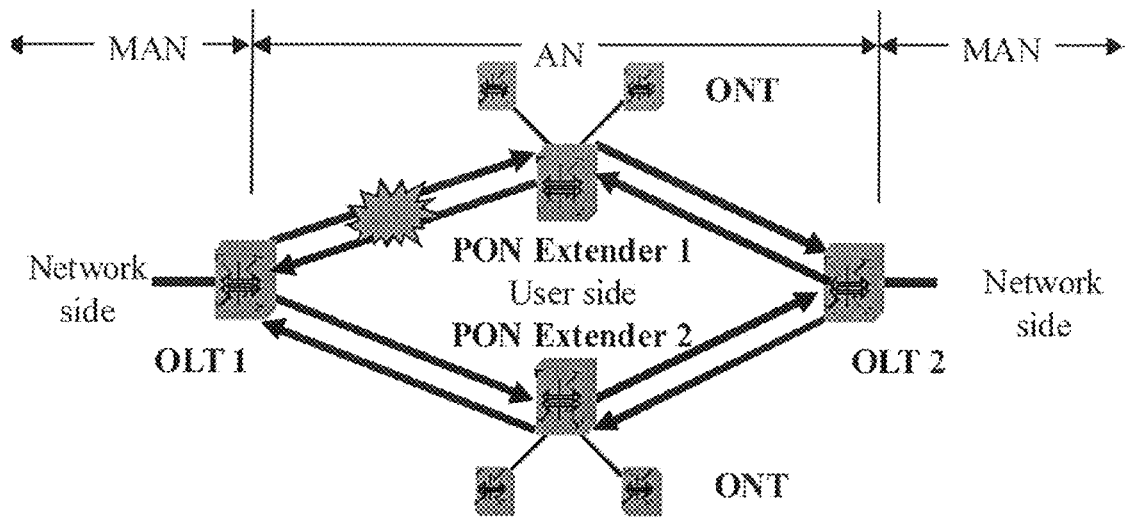
FIG. 5 is a schematic view of the structure of a PON ring system according to embodiment 4 of the present invention.

FIG. 5 is a schematic view of the structure of a PON ring system according to embodiment 4 of the present invention.

This embodiment is similar to embodiment 1 in structure, and the difference only lies in that, PON extender 1 and PON extender 2 are coupled to OLT1 and OLT2, so as to form a PON ring, and the PON extenders are subsequently coupled to the ONT/ONUs. Thereby, the data stream may flow in two directions, that is, in a clockwise direction along OLT1->Extender 2->OLT2->Extender 1->OLT1, or in a counterclockwise direction along OLT1->Extender 1->OLT2->Extender 2->OLT1.

In this embodiment, primary and backup links or load sharing links formed between the nodes are similar to the primary and backup links formed in embodiment 1, so the details may not be described herein again.

In the above four embodiments, a PON ring is formed by connecting user side edge node equipments with multiple OLTs. The present invention may also form a PON ring by connecting MAN side edge nodes with multiple OLTs.

The present invention also provides a PON ring system, which includes at least two edge nodes and at least two OLTs. The edge nodes, or at least two interconnected edge nodes, are coupled to the at least two OLTs to form a PON ring. In this way, the following advantages are achieved: The interfaces of the OLTs are uniformly PON interfaces, and the OLTs may not be provided with ETH interfaces for connection to the edge nodes, but coupled to the edge nodes via the PON interfaces instead; and meanwhile, PON broadcasting characteristics are possessed and the cost is low. The above edge nodes may be BNGs or broadband access servers (BRASS). The PON ring system is introduced in detail hereinafter.

Embodiment 5

Figure 6:
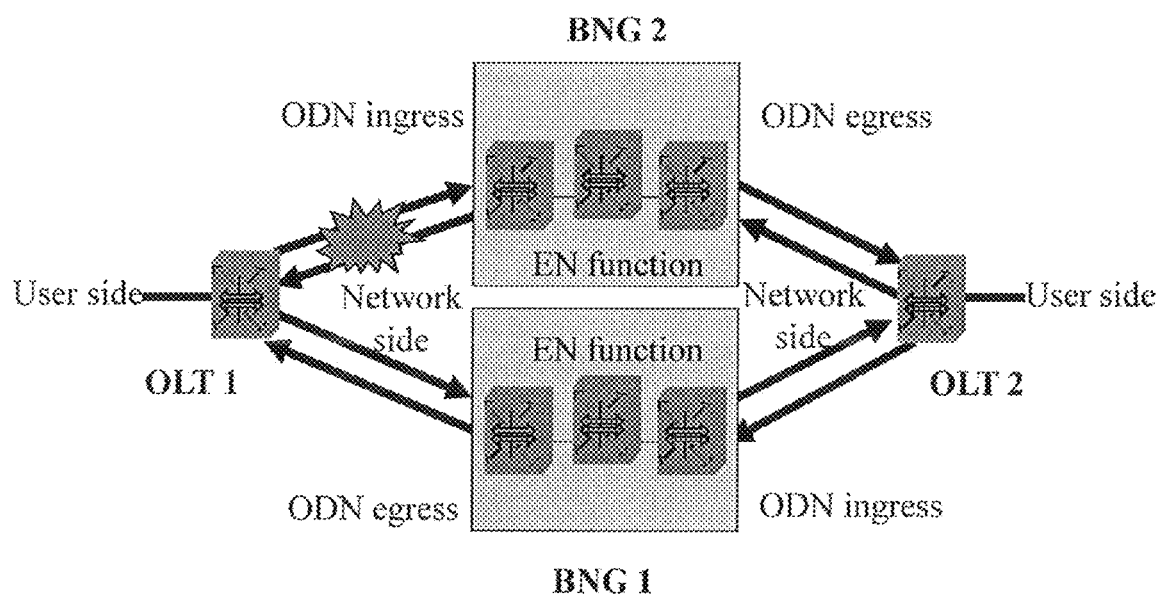
FIG. 6 is a schematic view of the structure of a PON ring system according to embodiment 5 of the present invention.

FIG. 6 is a schematic view of the structure of a PON ring system according to embodiment 5 of the present invention.

In this embodiment, BNGs are taken as an example of the edge nodes. In other embodiments of the present invention, BRASs or other edge nodes may also be adapted to form a PON ring system.

This embodiment is similar to embodiment 1 in structure, and the difference only lies in that, a BNG1 and a BNG2 are coupled to OLT1 and OLT2, so as to form a PON ring. Thereby, the data stream may flow in two directions, that is, in a clockwise direction along OLT1->BNG2->OLT2->BNG1->OLT1, or in a counterclockwise direction of OLT1->BNG1->OLT2->BNG2->OLT1.

In this embodiment, primary and backup links or load sharing links formed between the nodes are similar to the primary and backup links formed in embodiment 1, so the details may not be described herein again.

As shown in FIG. 6, the edge nodes in embodiment 5 include ODN ingress modules, edge node function modules and ODN egress modules.

The ODN ingress modules serve as ONT/ONU interfaces, and are adapted to receive data sent by the OLTs, process the received data in a PON physical layer and a data link layer, and forward the processed data to the edge node function modules. The ODN ingress modules may also be adapted to realize a PON connection switching function.

The edge node function modules are adapted to receive the data sent by the ODN ingress modules, implement processing function of IP edge nodes and send the processed data to the ODN egress modules.

The ODN egress modules serve as ONT/ONU interfaces, and are adapted to receive the data sent by the edge node function modules, process the received data in a PON physical layer and a data link layer, and forward the processed data to the OLTs coupled to the ODN egress modules. The ODN egress modules may also be adapted to realize a PON connection switching function.

The above edge nodes can be BNGs or BRASs.

Based on the above PON ring system, the present invention further provides a method for realizing primary and backup link protection in a PON, which includes the following steps.

A PON ring is established between at least two OLTs through at least two user side edge nodes or network side edge nodes, and each of the OLTs is coupled to any other OLT in the PON ring through the at least two edge nodes. Two links respectively in a clockwise direction and a counterclockwise direction exist in the PON ring, in which one link is a primary link and the other is a backup link.

When the primary link is normal, any node in the PON ring receives data via the primary link.

When the primary link fails, the failure is notified to nodes in the PON ring, so that any node in the PON ring receives data via the backup link.

The method further includes the following steps. When the failure of the primary link is recovered, the failure recovery is notified to nodes in the PON ring, so that any node in the PON ring system transmits data via the primary link, and the other nodes in the PON ring system receive the data transmitted in the primary link.

In the above method, when the primary link is normal, the method further includes: transmitting data via the backup link by any node in the PON ring. In other words, data can be transmitted in a "selective sending and receiving" mode. That is, a node serving as a sending end preferably chooses to send data in the primary link, while a node serving as a receiving end receives the data transmitted in the primary link. When the primary link fails, the node for sending data only chooses to send data in the backup link, and the node for receiving data receives the data transmitted in the backup link. Alternatively, data can be transmitted in a "multiple sending and selective receiving" mode. That is, a node serving as a sending end sends the same data on both the primary and backup links, while a node serving as a receiving end preferably receives the data transmitted in the primary link. When it is detected that the primary link fails, the node for receiving data receives data from the backup link that transmits data when the primary link is normal. Compared with the "selective sending and receiving" mode, the advantages of the "multiple sending and selective receiving" mode are that, when the primary link fails, the node for receiving data can be quickly switched to the backup link that always works normally, and receive the data transmitted in the backup link, and thus the process that the node of the sending end switches from the primary link to the backup link when sending data is skipped.

The method is introduced in detail hereinafter.

Embodiment 6

Figure 7A:
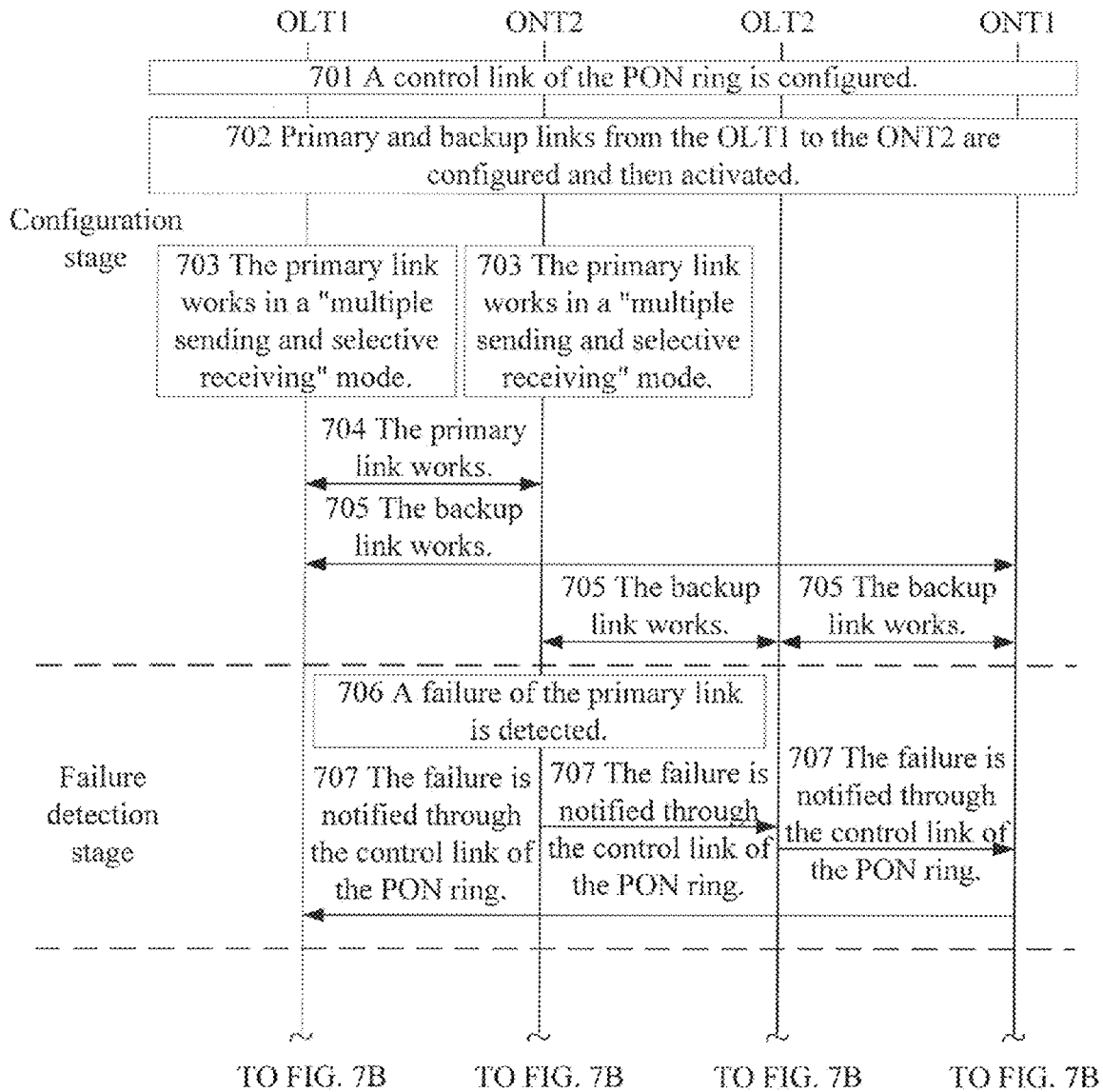
FIG. 7 is a flow chart of a method for realizing primary and backup link protection in a PON according to embodiment 6 of the present invention.
Figure 7B:
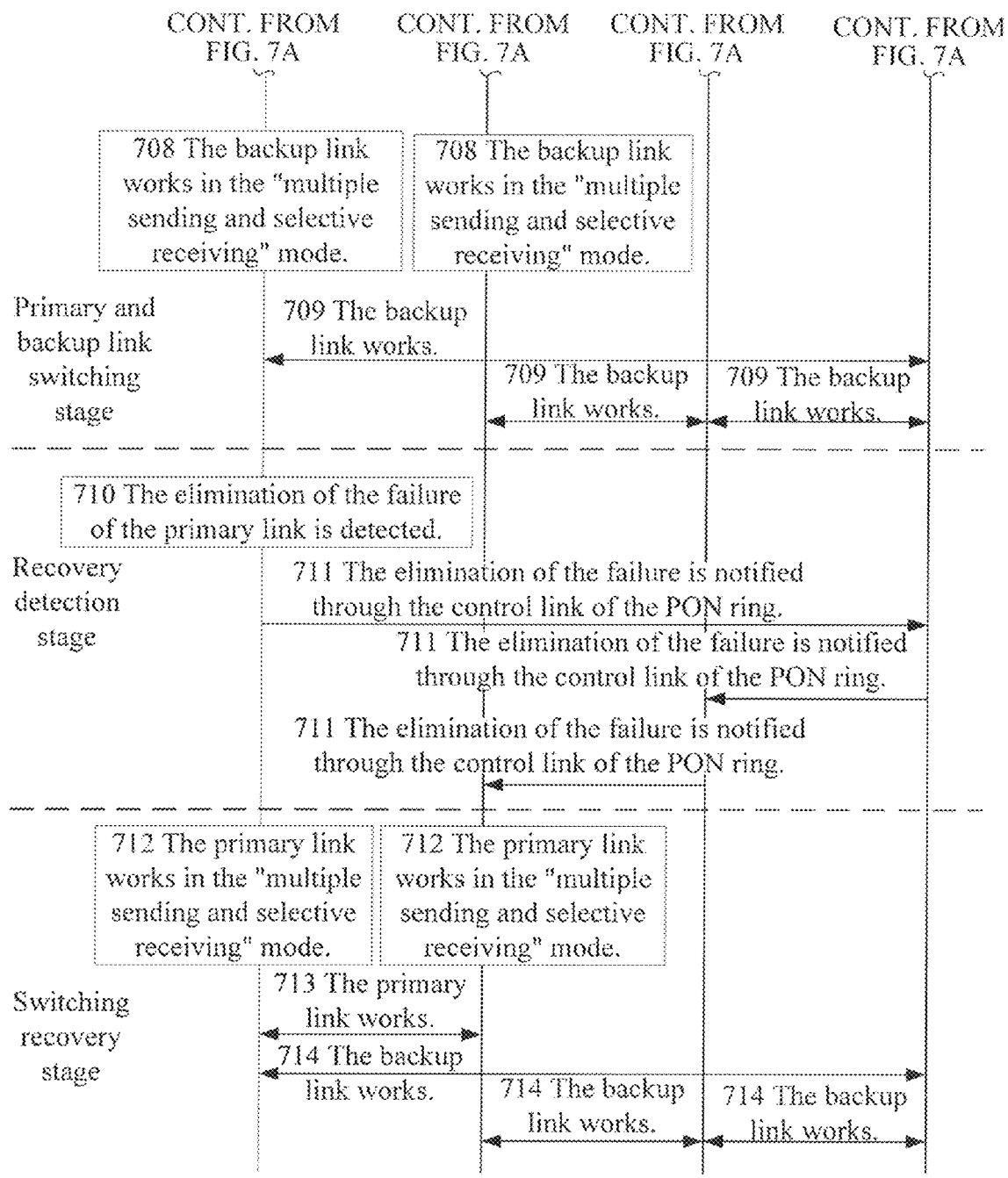

FIG. 7 is a signaling flow chart of a method for realizing primary and backup link protection in a PON according to embodiment 6 of the present invention. In this embodiment, data is transmitted in a "multiple sending and selective receiving" mode.

The method of this embodiment is based on the PON ring system as shown in FIG. 2a. In this embodiment, an OLT is taken as an example of a first node, and an OUN is taken as a second node. In other embodiments of the present invention, the first node may also be an OUN, and the second node may also be an OLT; or, the first node or the second node may be any node in the PON.

Firstly, a PON ring as shown in FIG. 2a is established. Next, the following steps are performed.

In step 701, a control link of the PON ring is configured.

The control link of the PON ring configured in this step may be used for operation, administration and maintenance (OAM) of the PON ring. For the ESP, the control link may be identified with a special virtual local area network (VLAN).

In step 702, primary and backup links from OLT1 to ONT2 are configured and then activated.

For the ESP, the primary and backup links may be identified with special primary and backup VLANs respectively.

In step 703, a source node (for example, OLT1) and a target node (for example, ONT2) of the links adopt the "multiple sending and selective receiving" mode for data transmission.

In this step, the transmission mode of "multiple sending and selective receiving" is that, the nodes send data to the primary link and the backup link simultaneously in a broadcast or multicast mode, but only choose to receive data via the primary link. The PON itself supports the broadcasting from the OLT to the ONT, and does not need broadcast replication.

In step 704, between the source node (for example, OLT1) and the target node (for example, ONT2) of the links, data communication is implemented in the primary link of OLT1<->ONT2.

In step 705, between the source node (for example, OLT1) and the target node (for example, ONT2) of the links, data communication is implemented in the backup link of OLT1<->ONT1<->OLT2<->ONT2.

As the "multiple sending" mode is adopted, data communication between the source node (for example, OLT1) and the target node (for example, ONT2) of the links may also be implemented via the backup link of OLT1<->ONT1<->OLT2<->ONT2, but the target node (for example, ONT2) of the links does not receive the data in the backup link.

In step 706, ONT2 detects that the primary link of OLT1<->ONT2 fails.

The nodes of the PON ring have a failure detection function. In this step, ONT2 detects that the primary link of OLT1<->ONT2 fails. In other embodiments of the present invention, other nodes, such as OLT1, may also detect the failure of the primary link.

In step 707, ONT2 notifies the failure of the primary link of OLT1<->ONT2 to the other ring nodes through the control link of the PON ring.

The node that detects the failure of the primary link (ONT2 in this embodiment) notifies the failure of the primary link of OLT1<->ONT2 to the other ring nodes through the control link of the PON ring. In other embodiments of the present invention, a control center of the PON ring may be notified by ONT2, and the control center of the PON ring further notifies the failure of the primary link of OLT1<->ONT2 to the other ring nodes through the control link of the PON ring.

In step 708, the source node (for example, OLT1) and the target node (for example, ONT2) choose to receive data via the backup link.

The source node (for example, OLT1) and the target node (for example, ONT2) of the links still adopt the transmission mode of "multiple sending and selective receiving" to implement "multiple sending", but choose to receive data via the backup link.

In step 709, data communication is implemented in the backup link between the source node (for example, OLT1) and the target node (for example, ONT2).

The data communication between the source node (for example, OLT1) and the target node (for example, ONT2) of the links is implemented in the backup link of OLT1<->ONT1<->OLT2<->ONT2.

In step 710, OLT1 detects that the failure of the primary link of OLT1<->ONT2 is recovered.

In other embodiments of the present invention, other nodes, such as ONT2, may also detect the failure recovery of the primary link.

In step 711, the node that detects the failure recovery of the primary link (OLT1 in this embodiment) notifies the failure recovery of the primary link of OLT1<->ONT2 to the other ring nodes through the control link of the PON ring.

In other embodiments of the present invention, the control center of the PON ring may also be notified by OLT1, and the control center of the PON ring further notifies the failure recovery of the primary link of OLT1<->ONT2 to the other ring nodes through the control link of the PON ring.

In step 712, the data reception via the primary link is recovered between the source node (for example, OLT1) and the target node (for example, ONT2).

The source node (for example, OLT1) and the target node (for example, ONT2) of the links still adopt the transmission mode of "multiple sending and selective receiving" to implement "multiple sending", and recover the data reception via the primary link.

In step 713, between the source node (for example, OLT1) and the target node (for example, ONT2) of the links, data communication is recovered in the primary link of OLT1<->ONT2.

In step 714, the data communication between the source node (for example, OLT1) and the target node (for example, ONT2) is implemented in the backup link of OLT1<->ONT1<->OLT2<->ONT2 simultaneously.

As the "multiple sending" mode is adopted, the data communication between the source node (for example, OLT1) and the target node (for example, ONT2) of the links also exists in the backup link of OLT1<->ONT1<->OLT2<->ONT2.

Embodiment 7

Figure 8A:
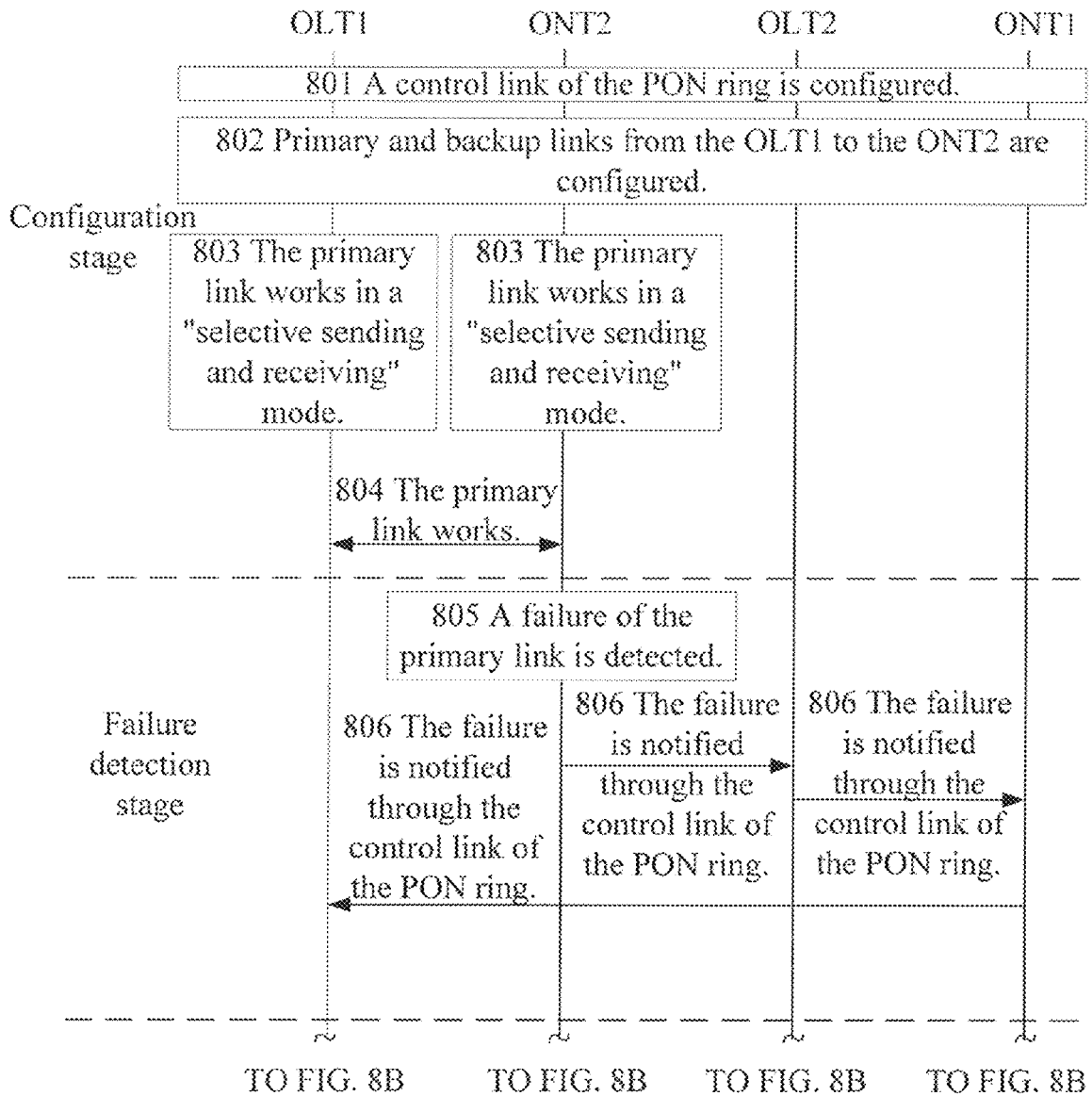
FIG. 8 is a flow chart of a method for realizing primary and backup link protection in a PON according to embodiment 7 of the present invention.
Figure 8B:
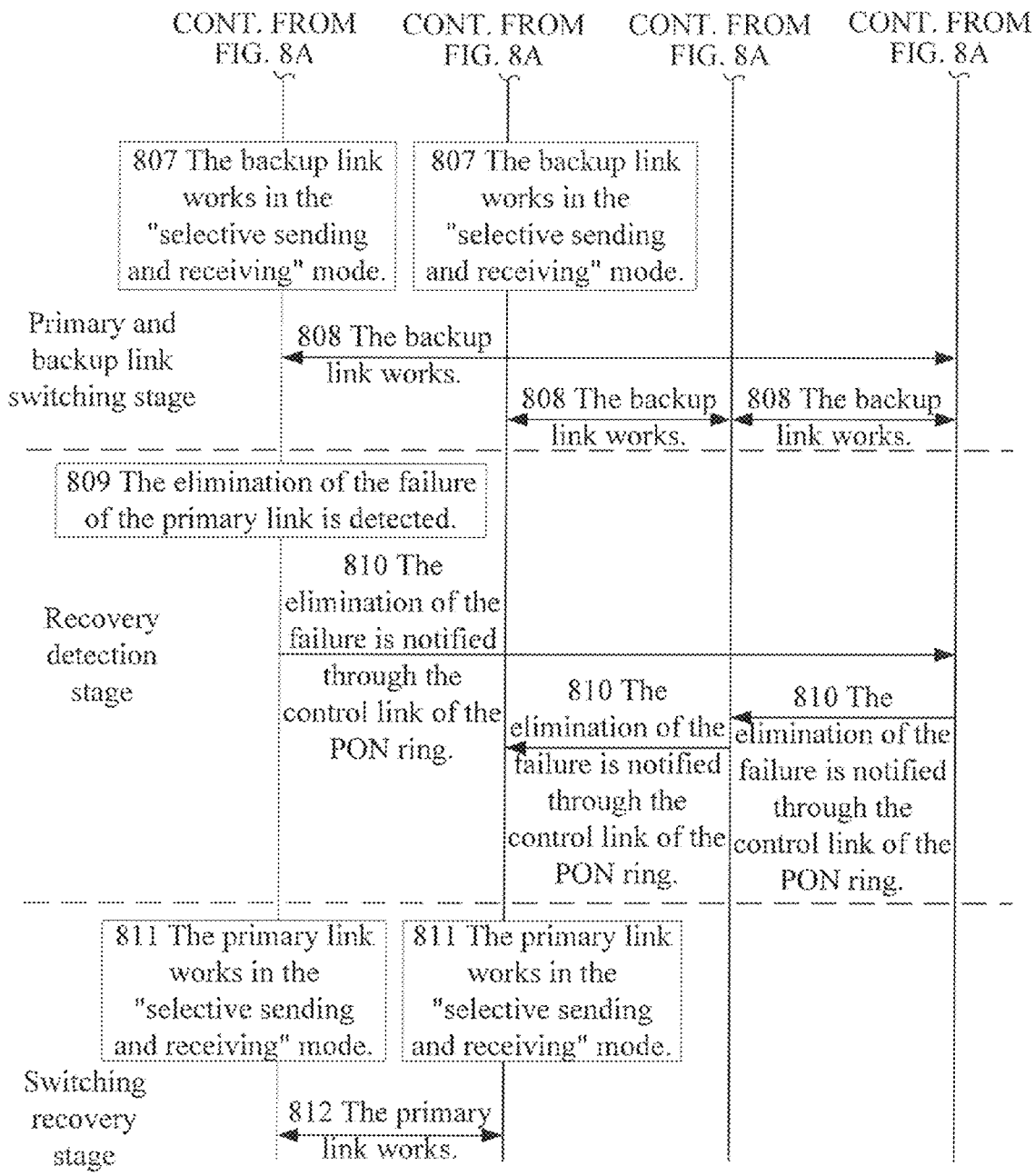

FIG. 8 is a flow chart of a method for realizing primary and backup link protection in a PON according to embodiment 7 of the present invention. In this embodiment, data is transmitted in a "selective sending and receiving" mode.

The method of this embodiment is based on the PON ring system as shown in FIG. 2a. In this embodiment, an OLT is taken as an example of a first node, and an OUN is taken as an example of a second node. In other embodiments of the present invention, the first node may also be an OUN, and the second node may also be an OLT; or, the first node or the second node may be any node in the PON.

Firstly, a PON ring as shown in FIG. 2a is established. Next, the following steps are performed.

In step 801, a control link of the PON ring is configured.

The control link of the PON ring configured in this step may be used for OAM of the PON ring. For the ESP, the control link may be identified with a VLAN.

In step 802, primary and backup links from OLT1 to ONT2 are configured.

For the ESP, the primary and backup links may be identified with special primary and backup VLANs.

In step 803, a source node (for example, OLT1) and a target node (for example, ONT2) of the links adopt the transmission mode of "selective sending and receiving", and choose to send and receive data via the primary link.

In step 804, between the source node (for example, OLT1) and the target node (for example, ONT2) of the links, data communication is implemented in the primary link of OLT1<->ONT2.

In step 805, ONT2 detects that the primary link of OLT1<->ONT2 fails.

The nodes of the PON ring have a failure detection function. In this step, ONT2 detects that the primary link of OLT1<->ONT2 fails. In other embodiments of the present invention, other nodes, such as OLT1, may also detect the failure of the primary link.

In step 806, the node that detects the failure of the primary link (ONT2 in this embodiment) notifies the failure of the primary link of OLT1<->ONT2 to the other ring nodes through the control link of the PON ring.

In other embodiments of the present invention, a control center of the PON ring may be notified by ONT2, and the control center of the PON ring further notifies the failure of the primary link of OLT1<->ONT2 to the other ring nodes through the control link of the PON ring.

In step 807, the source node (for example, OLT1) and the target node (for example, ONT2) of the links adopt the transmission mode of "selective sending and receiving", and choose to send and receive data via the backup link.

In step 808, the data communication between the source node (for example, OLT1) and the target node (for example, ONT2) of the links is implemented in the backup link of OLT1<->ONT1<->OLT2<->ONT2.

In step 809, OLT1 detects that the failure of the primary link of OLT1<->ONT2 is recovered.

In other embodiments of the present invention, other nodes, such as ONT2, may also detect the failure recovery of the primary link.

In step 810, the node that detects the failure recovery of the primary link (OLT1 in this embodiment) notifies the failure recovery of the primary link of OLT1<->ONT2 to the other ring nodes through the control link of the PON ring.

In other embodiments of the present invention, the control center of the PON ring may also be notified by OLT1, and the control center of the PON ring further notifies the failure recovery of the primary link of OLT1<->ONT2 to the other ring nodes through the control link of the PON ring.

In step 811, the source node (for example, OLT1) and the target node (for example, ONT2) of the links adopt the transmission mode of "selective sending and receiving", and recover the data sending and reception via the primary link.

In step 812, between the source node (for example, OLT1) and the target node (for example, ONT2) of the links, the data communication is recovered in the primary link of OLT1<->ONT2.

In the above embodiments 6 and 7, firstly, a PON ring is established. Primary and backup links from OLT1 to ONT2 are configured on the established PON ring, and data is preferably received in the primary link. When the primary link fails, data transmitted in the backup link is received, thereby realizing the primary and backup link protection from OLT1 to ONT2. The above two embodiments are only exemplary by using the links from OLT1 to ONT2. It can be easily understood that, on the PON ring, the primary and backup links can be configured between any two nodes to realize the primary and backup link protection. For example, the primary and backup link protection may all be realized through the links configured between ONT2 and OLT1, between OLT1 and OLT2, or between OUT1 and OUT2, which will not be described in detail herein.

It can be seen from the above that, in the method for realizing primary and backup link protection in the PON and the PON ring system according to the embodiments of the present invention, the user side edge node equipments or the edge nodes are coupled to multiple OLTs to form the PON ring. The primary and backup links are configured for the path between any two nodes in the PON on the basis of the PON ring, so as to realize the primary and backup link protection in the PON, and reduce the impact on the PON caused by single link failure in the network.

The above descriptions are merely some exemplary embodiments of the present invention, but are not intended to limit the present invention. Any modification, equivalent replacement, or improvement made without departing from the spirit and principle of the present invention shall fall within the scope of the invention.

What is claimed is:

1. A method for realizing primary and backup link protection in a passive optical network (PON), the method comprising, establishing a PON ring between at least two optical line terminations (OLTs) through at least two user side edge nodes, a topology of the PON ring is an inverse-connection of at least two Point-to-Multipoint trees, wherein the at least two user side edge nodes are at least two optical network terminals (ONTs), or are at least two optical network units (ONUs), and each of the OLTs is coupled to any other OLT in the PON ring through the at least two edge nodes, the at least two OLTs are roots of the at least two Point-to-Multipoint trees, and the at least two user side edge nodes are leaves of the at least two Point-to-Multipoint trees; and configuring two links respectively in a clockwise direction and a counterclockwise direction in the PON ring, wherein one link is a primary link and the other link is a backup link;

when the primary link is normal, receiving data via the primary link by the nodes in the PON ring, and when the primary link fails, notifying the nodes in the PON ring of a failure and receiving the data via the backup link by the nodes in the PON ring;

when the primary link is normal, in a first transmitting and receiving mode, transmitting data via the primary link and the backup link by the nodes in the PON ring and receiving the data via only the primary link by the nodes in the PON ring; and when the primary link is normal, in a second transmitting and receiving mode, transmitting and receiving data via only the primary link by the nodes in the PON ring.

2. The method according to claim 1, further comprising: when the failure of the primary link is recovered, notifying each node in the PON ring of the failure recovery; and receiving the data via the primary link by each node in the PON ring.

3. The method according to claim 1, wherein each node in the PON ring is notified of the failure or of a failure recovery via a preset control link.

4. The method according to claim 1, wherein each of the at least two user side edge nodes belongs to a different Point-to-Multipoint tree of the at least two Point-to-Multipoint trees, wherein any two Point-to-Multipoint trees of the at least two Point-to-Multipoint trees are connected between their leaves to form an inverse-connection of two Point-to-Multipoint trees.

5. A passive optical network (PON) ring system, comprising: at least two user side edge nodes, and at least two optical line terminations (OLTs), wherein a PON ring is established between the at least two OLTs through the at least two user side edge nodes, a topology of the PON ring is an inverse-connection of at least two Point-to-Multipoint trees, wherein the at least two user side edge nodes are at least two optical network terminals (ONTs), or are at least two optical network units (ONUs), and each of the OLTs is coupled to any other OLT in the system through the at least two edge nodes, the at least two OLTs are roots of the at least two Point-to-Multipoint trees, and the at least two user side edge nodes are leaves of the at least two Point-to-Multipoint trees;

wherein the PON ring is adapted to configure two links respectively in a clockwise direction and a counterclockwise direction, wherein one link is a primary link and the other link is a backup link;

when the primary link is normal, the nodes in the PON ring of the system receive data via the primary link, and when the primary link fails, the nodes in the PON ring of the system receive the data via the backup link;

wherein when the primary link is normal, in a first transmit and receive mode, the nodes in the PON ring transmit data via the primary link and the backup link and receive the data via only the primary link; and wherein when the primary link is normal, in a second transmit and receive mode, the nodes in the PON ring transmit and receive data via only the primary link.

6. The system according to claim 5, wherein each of the at least two user side edge nodes belongs to a different Point-to-Multipoint tree of the at least two Point-to-Multipoint trees, wherein any two Point-to-Multipoint trees of the at least two Point-to-Multipoint trees are connected between their leaves to form an inverse-connection of two Point-to-Multipoint trees.

7. A method for realizing primary and backup link protection in a passive optical network (PON), the method comprising, establishing a PON ring between at least two optical line terminations (OLTs) through at least two PON extenders, each of the at least two PON extenders connects to an optical network terminal (ONT) or an optical network unit (ONU), and the at least two OLTs communicate with the ONT or the ONU through the PON extender, a topology of the PON ring is an inverse-connection of at least two Point-to-Multipoint trees, and each of the OLTs is coupled to any other OLT in the PON ring through the at least two PON extenders, the at least two OLTs are roots of the at least two Point-to-Multipoint trees, and the at least two PON extenders are leaves of the at least two Point-to-Multipoint trees;

configuring two links respectively in a clockwise direction and a counterclockwise direction in the PON ring, wherein one link is a primary link and the other link is a backup link;

when the primary link is normal, receiving data via the primary link by the nodes in the PON ring, and when the primary link fails, notifying the nodes in the PON ring of a failure and receiving the data via the backup link by the nodes in the PON ring;

when the primary link is normal, in a first transmitting and receiving mode, transmitting data via the primary link and the backup link by the nodes in the PON ring and receiving the data via only the primary link by the nodes in the PON ring; and when the primary link is normal, in a second transmitting and receiving mode, transmitting and receiving data via only the primary link by the nodes in the PON ring.

* * * * *